Nov. 25, 1947.　　　　G. N. STRIKE　　　　2,431,593

VALVE

Filed Feb. 14, 1944

INVENTOR.
GEORGE N. STRIKE
BY Carlos G. Stratton
ATTORNEY.

Patented Nov. 25, 1947

2,431,593

UNITED STATES PATENT OFFICE 2,431,593

VALVE

George N. Strike, Los Angeles, Calif.

Application February 14, 1944, Serial No. 522,231

6 Claims. (Cl. 251—13)

My invention relates to a valve, and has for its principal object to provide a valve with resilient closing means that will seat in a wide variety of positions so as to avoid wearing out the resilient means by repeated closing in the same limited area of the resilient means.

Another object of the invention is to provide automatic means that will close the flow of fluid through my valve, when the housing is disassembled, to reach the operating mechanism of the valve, for repair or replacement.

Still another object of the invention is to provide means for discharging either or both of two fluids from the valve, and of limiting the flow of either fluid relative to the other, by a single operating means.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Figure 2:
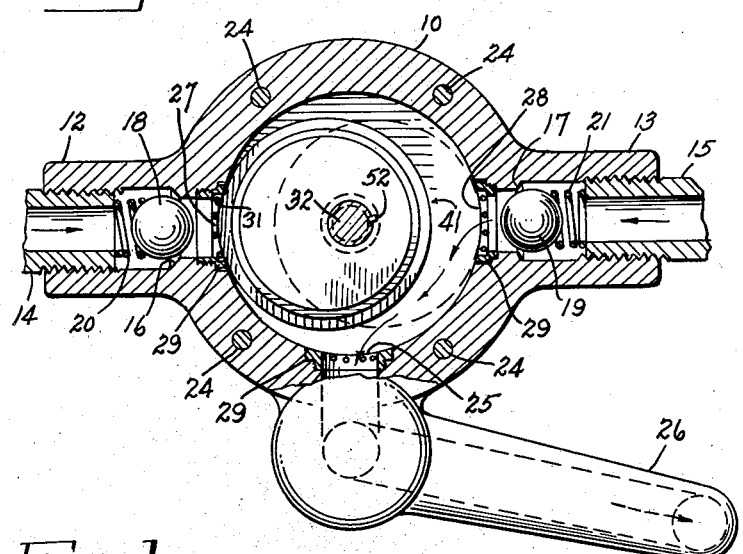
Fig. 2 is a horizontal section, taken along the line 2—2 of Fig. 1.

Referring more in detail to the drawings, the reference number 10 generally designates a housing defining an interior, completely cylindrical chamber which is provided with inlet nipples 12 and 13. Supply conduits 14 and 15 are respectively screwed into the nipples 12 and 13. The housing has internal shoulders 16 and 17 opposite the conduits 14 and 15. Ball shut-off valves 18 and 19 are urged against the shoulders 16 and 17 by coil springs 20 and 21 respectively. Flow through the conduits 14 and 15 in the directions of the arrows therein also tends to seat the ball valves 18 and 19.

Figure 1:
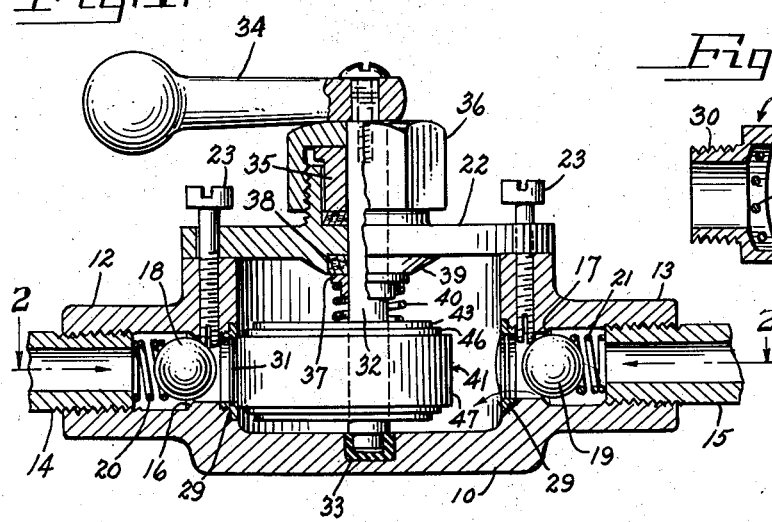
Fig. 1 is a vertical section, partly in elevation, showing a valve embodying the foregoing features.

Bolts 23 pass through a plate 22. When the bolts 23 are screwed home, they co-operate with bolts 24 to hold the plate in place tight against the housing 10 and the inner ends thereof hold the ball valves 18 and 19 away from their seats 16 and 17. In Fig. 1 the bolts 23 are just beginning to move the ball valves 18 and 19 away from their respective seats. As the bolts 23 are screwed down farther, the balls are pushed away from their seats against the action of the coil springs 20 and 21, permitting the flow of fluid through the nipples 12 and 13 around the ball valves.

It is believed clear to those skilled in the art, without further illustration, that suitable gasket means may be used for maintaining the top plate in liquid-tight engagement with the housing 10.

The outlet port 25 in the housing 10 connects with a swinging spout 26. The swinging spout is of conventional construction so it is believed further illustration is not necessary for those skilled in the art. Suffice to state that the flow is in the direction of the broken arrow through the spout 26.

Figures 4, 5:
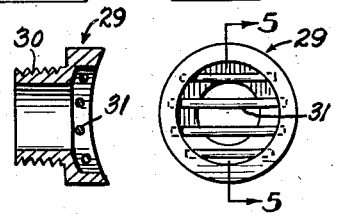
Fig. 4 is an enlarged face view of a grid element employed in the invention.
Fig. 5 is a section taken on the line 5—5 of Fig. 4, looking in the direction of the arrows.

In the outlet port 25 and in the inlet ports 27 and 28 within the housing 10 are disposed grids 29, such as shown enlarged in Figs. 4 and 5. The grids 29 are screw plugs, as suggested at 30, for screwing into tapped portions of said ports 25, 27 and 28. The grids also include a plurality of bars 31 for the purpose hereinafter described. It will be observed that the said plugs 29 for the valve port seats 25, 27 and 28, lie in an arc corresponding to the interior curve of the chamber of the housing 10 and flush therewith.

The rotary closure member for the valve comprises a shaft 32 which has a resilient stepped bearing 33 in the floor of the housing 10. A handle 34, exterior of the housing 10, controls the operation of the closure member. A packing gland 35 is held in place by a packing nut 36 around the shaft 32. The gland 35 prevents escape of liquid through the central aperture of the top plate 22. Inside the housing, another packing gland 37 tends to compress packing 38 within a ring 39 depending interiorly from the top plate 22. A coil spring 40 urges the gland 37 into its packing, compressing position. The other end of the spring 40 abuts against the closure member 41 and tends to maintain said member in the plane of the ports in the housing.

The closure member or cam-shaped rotor 41 mounted on the shaft 32 includes a cylindrical body member 42 that is keyed and eccentrically mounted on the shaft, at 52. Top and bottom flange members 43 and 44 on the body 42 hold an annular member 45 against vertical displacement. The annular member 45 in turn has flanges 46 at opposite sides which hold a resilient band 47 in place. The annulus 45 is preferably of resilient metal. In assembling, the band 47 is stretched to get it over the flange 46. The band 47 thereupon snaps onto the circumferential groove of the annulus 45.

It will be seen and understood from the above that the longest radial arc of the eccentrically mounted closure member 41, with its complementary adjuncts, as included, when operated by the handle 34, described a circle within the cylindrical chamber, the resilient band being in constant contact with the inner surface of the cylindrical wall and the incident traction between the engaging surfaces causing the band 47 and annular member 45 to revolve relatively to the eccentric closure member 41 during its revolving movement. In this manner, the area of contact of the resilient band 47 is a constantly changing one, thus presenting for co-operation with the seats in said chamber continually changing areas.

The grid bars 31 prevent undue bulging of the band 47 into the ports, when closing same.

Figure 3:
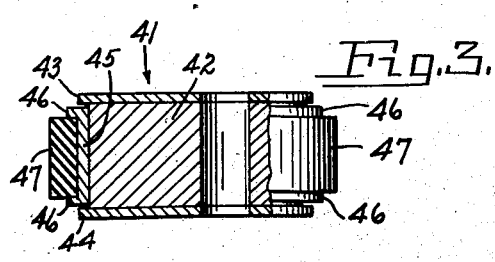
Fig. 3 is a partly sectional view of a closure element comprised in the embodiment.

In the operation of the form shown in Figs. 1 to 3, the handle 34 may be turned so that the resilient band 47 shuts off the flow from the conduit 14 (as shown in Figs. 1 and 2). In this position of the closure member 41, liquid is permitted to flow from the conduit 15 to the spout 26, as indicated by the arrows between the ports 28 and 25 in Fig. 2. It is also believed clear without further illustration that the closure member 41 may be turned so that flow is prevented from the conduit 15 into the housing 10, but permitting flow from the conduit 14 to the spout 26. Moreover, it is believed clear that the closure member 41 may be turned to close the outlet port 25. In this position, all flow through the housing 10 is stopped.

It will be noticed that the annulus 45 is not fastened to the body member 42; in fact, it is desired to have the annulus 45 loosely fitted around the body member 42 between the flanges 43 and 44. By this means, the annulus is free to turn around the body 42 whenever the band 47 engages the inner surface of the housing 10. This is a distinct advantage in that the band 47 will seat at inlet and outlet ports in a wide variety of positions; in fact, in a different position almost every time. Because of this operation, the band 47 will not have to be replaced because of wear, until it deteriorates to a point where it substantially loses its elasticity. Wear on the band will thereby be reduced to a minimum. It is believed clear without further illustration that for certain purposes the annulus 45 may be eliminated and the band 47 allowed to float freely between the flanges 43 and 44 and freely turn around the body member 42. The inherent resilience of the band 47 will contract it from the stretched condition shown in Fig. 3, so that it will not slip sideways over one of the flanges on the body and yet be loose enough to turn upon the body.

The manner in which the ball valves 18 and 19 automatically shut off the flow when the bolts 23 are removed, has been hereinbefore described. In normal operation, the ball valves 18 and 19 are held away from their seats by the bolts 23.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a valve, a housing defining a completely cylindrical chamber having inlet and outlet ports through which fluids may flow, a shaft axially rotatable in said housing, a valve fixed on said shaft comprising an offset cylindrical body having its periphery at the maximum radius of rotation thereof in fixed relation to the wall of said cylindrical chamber, said body having spaced peripheral flanges, a rim between the flanges thereof and loosely surrounding said body, said rim having spaced flanges, and a resilient band embracing said rim between the flanges thereof, the periphery of said body holding the resilient band in compressive engagement with the cylinder wall and rotatively moving said band to and from a seat closing position.

2. In a valve, a cylindrical housing provided with a seat through which fluid may flow, an axially disposed shaft in said housing, a cylindrical member eccentrically mounted with respect to and on said shaft and provided with spaced flanges, an annulus mounted to rotate on and independently of said cylindrical member, said annulus having spaced peripheral flanges, a resilient band on and between the flanges of said annulus, said cylindrical member having a portion of its periphery at the maximum radius of its rotation in proximity to the cylindrical wall of said housing, and being adapted to maintain the band in frictional and compressive engagement with the cylinder wall whereby upon rotation of said cylindrical member said resilient band will track rotatively upon the wall of the cylindrical housing independently of said member to and from a seat closing position.

3. In a valve, a cylindrical housing provided with a seat through which fluid may flow, an axially disposed shaft in said housing, a cylindrical member eccentrically mounted with respect to and on said shaft, an annulus mounted to rotate on and independently of said cylindrical member, said annulus having spaced flanges, a resilient band on and between the flanges of said annulus, said cylindrical member having a portion of its periphery in fixed proximity to the cylindrical wall of the housing and being adapted to maintain the band in frictional engagement with the wall of the housing whereby upon rotation of said member said resilient band will track rotatively upon the wall of the housing to and from a seat closing position, and resilient means to maintain the cylindrical member in the plane of the seat.

4. A valve comprising a cylindrical housing having ports, a shaft axially disposed therein, a cylindrical body fixed on and axially offset with respect to said shaft, said body having an independently rotatable band and a part of the periphery of said band at the maximum radius of rotation of said body being in constant contact with the wall of said cylindrical housing and rotatively and slidably movable on the cylindrical body to port closing and opening position.

5. A valve comprising a cylindrical housing having ports, a shaft axially disposed therein, a cylindrical member fixedly mounted on and rotatable with said shaft, said member being offset with respect to said shaft and the periphery of said body at the maximum radius of rotation thereof maintaining a constant relation to the wall of the housing during the rotation thereof, and an independently rotating compressible band surrounding the periphery of said member and a part only of the outer periphery of said band at the maximum radius of rotation of said member constantly having rolling engagement with the wall of said housing and rotatively movable slidably on the cylindrical body during any revolution of the cylindrical member to port seating and unseating position.

6. A valve comprising a cylindrical housing having ports, a shaft axially disposed therein, a completely cylindrical member fixedly mounted on and axially offset with relation to said axial shaft and provided with a peripheral rotatable band, the periphery of said member at the maximum radius of rotation thereof maintaining a fixed relation to and slidably holding said band in constant rotative and rolling engagement with the wall of said housing during any revolution of said member to move said band to port seating and unseating position.

GEORGE N. STRIKE.

REFERENCES CITED

The following references are of record in the file of this patent:

UNITED STATES PATENTS

| Number | Name | Date |
| --- | --- | --- |
| 2,165,874 | Sauls | July 11, 1939 |
| 191,663 | Ellis | June 5, 1877 |
| 1,166,571 | Bard | Jan. 4, 1916 |
| 1,429,528 | Payne | Sept. 19, 1922 |

FOREIGN PATENTS

| Number | Country | Date |
| --- | --- | --- |
| 624,406 | Germany | 1936 |